INVENTOR
Paul A. Schumann
BY Anthony A. O'Brien
ATTORNEY

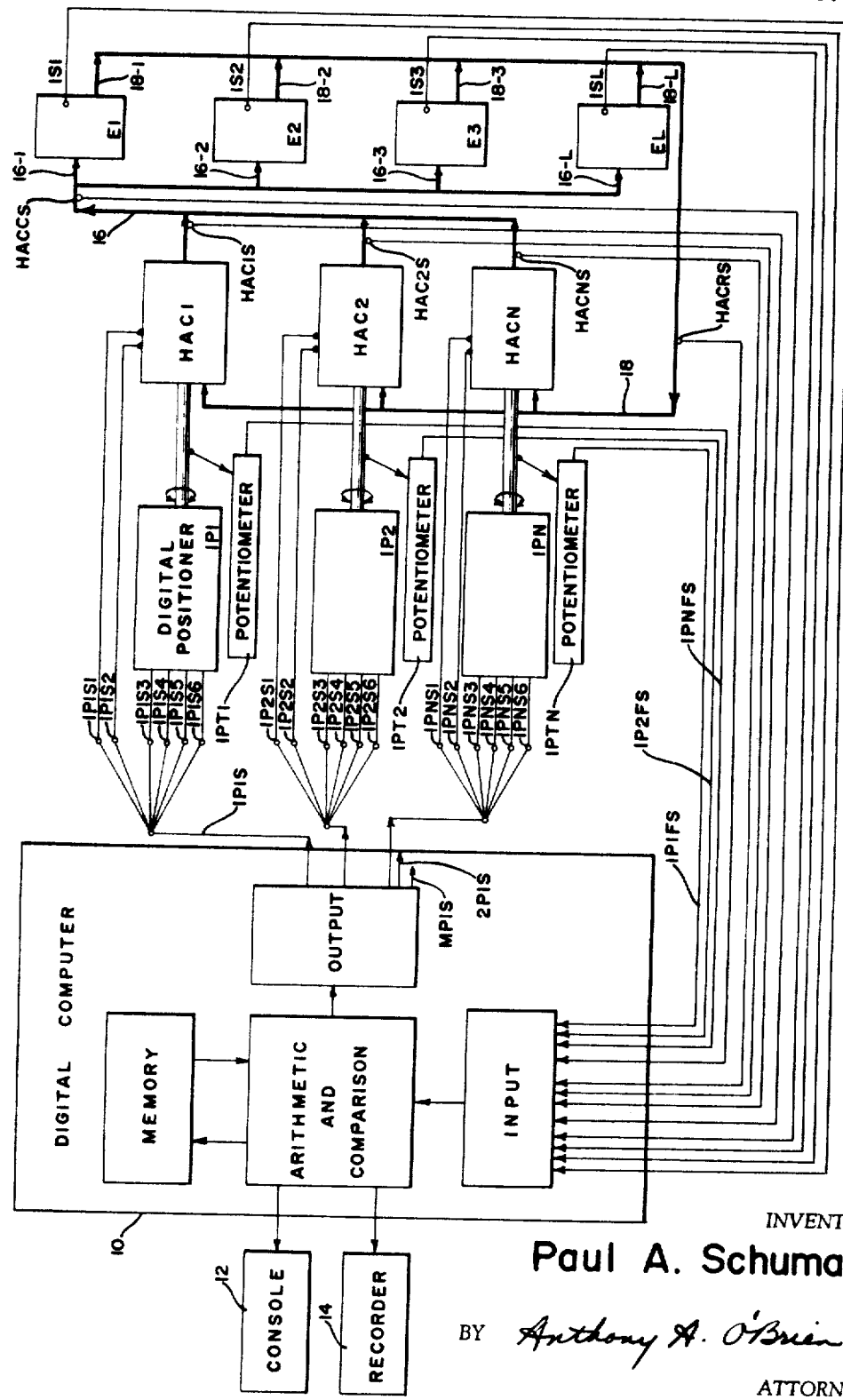

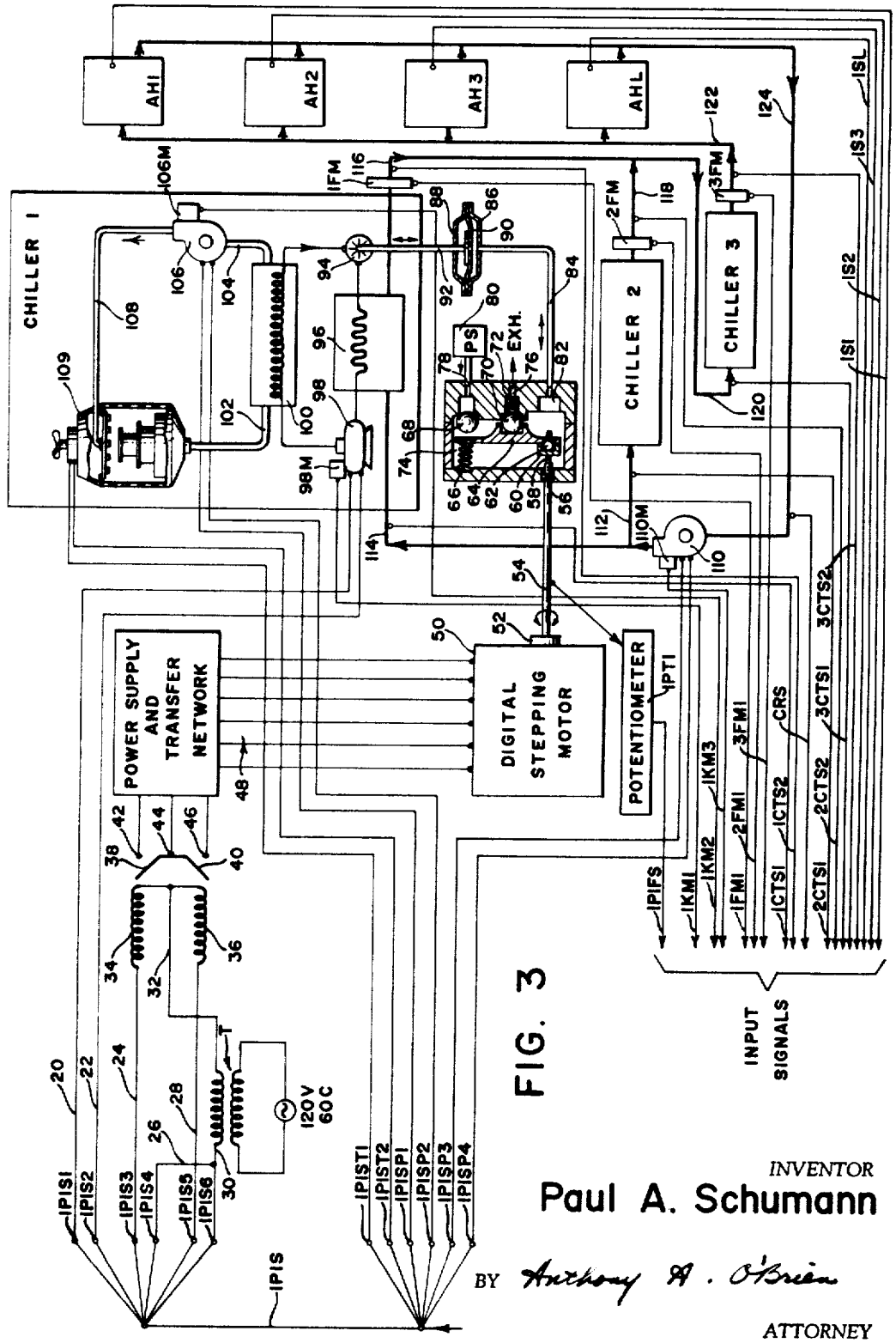

United States Patent Office 3,400,374
Patented Sept. 3, 1968

3,400,374
COMPUTERIZED CONTROL SYSTEMS
Paul A. Schumann, Richmond, Va., assignor to Robertshaw Controls Company, Richmond, Va., a corporation of Delaware
Filed June 16, 1965, Ser. No. 464,404
20 Claims. (Cl. 340—172.5)

ABSTRACT OF THE DISCLOSURE

A computerized control system for buildings having a plurality of operating systems, such as heating and cooling systems, and a plurality of control devices for each operating system, a digital computer with a memory programmed to control points for the control devices receives input signals related to the condition being controlled and, after comparison with the corresponding control points in its memory, delivers corrective output signals to a digital positioner associated with each control device.

---

This invention relates to automated control systems for large buildings and in particular to computerized control systems for the electrical and mechanical operating systems in large commercial buildings such as modern office buildings, zoned manufacturing plants, college complexes of a university, etc.

Automation of building control systems has progressed in recent years to the point of centralization, i.e., all the control systems are controlled from a single location, such as an engineer's control room wherein control signals are initiated, data recorded, and safety controls are maintained. The information channelled back to the engineer's room has been fed into a computer which performed a data logging function to present a complete record of the operating systems.

However, none of the prior art installations include the feature whereby a computer not only receives and records signals from the various operating systems in a building but also initiates corrective action to such control systems in response to variation from desired control points.

It is, therefore, an object of this invention to computerize the control of the operating systems in a building.

Another object of this invention is to reduce supervision and maintenance costs of building control systems to minimum heretofore unattainable.

Another object of this invention is to utilize a computer as a main control for a plurality of building control systems.

The present invention has another object in that a plurality of components in a building operating system are controlled separately and collectively for maximum operating efficiency of such components.

This invention has another object in that a plurality of control systems in a building complex are controlled by a computer which transmits signals for individually controlling the various control devices of each control system.

Another object of this invention is to provide a building operating system with direct digital control.

It is another object of this invention to combine a plurality of digital positioning devices with a plurality of control devices in the control systems of a building in order that digital output signals from a computer may directly control the plurality of control devices.

Another object of this invention is to program into the memory of a computer a complete listing of all the control points which are desired to be maintained by the various control systems in the operating systems of a building.

In accordance with another feature of this invention, a plurality of condition sensors transmit signals to a computer as indications of the conditions to be controlled in the particular control system of a building, and the computer transmits signals to the condition control means for correcting variations from such conditions.

The present invention has another object in that a building operating system, such as a heating-ventilating-air conditioning system, provided with a plurality of machines, is controlled by a computer.

It is another object of this invention to optimize the operation of a plurality of machines in a building operating system, such as a heating-ventilating-air conditioning system.

This invention has another object in that a building operating system, such as a heating-ventilating-air conditioning system, having a plurality of machines, has a computerized control system for determining which machine or machines are to be operated and the capacity at which such machine or machines are to be operated.

This invention has another object in that a computer is furnished with a memory including data corresponding to the operation of an operating system and all control points that are needed for environmental control of a building, a plurality of sensors in the building transmits signals to the computer for changing the program of the computer in accordance with particular environmental condition variations.

Another object of this invention is to minimize the frequency of starts of a plurality of machines in a building operating system by modulating one or more of such machines.

This invention has another object in that a plurality of chiller machines in a building control system are modulated so that the outputs therefrom are integrated for meeting the chilling requirements of a building.

It is another object of this invention to anticipate environment changes in a building air-conditioning system by direct digital control to move the inlet vanes of the air-conditioning chiller machine from a position corresponding to a preselected temperature.

Other objects and advantages of the present invention will become apparent from the following description of a preferred embodiment taken in connection with the accompanying drawing wherein:

FIG. 2 is a schematic diagram of a portion of FIG. 1 with the details of a building control system added thereto; and FIG. 3 is a schematic diagram similar to FIG. 2 illustrating the details of a specific control system.

Figure 1:
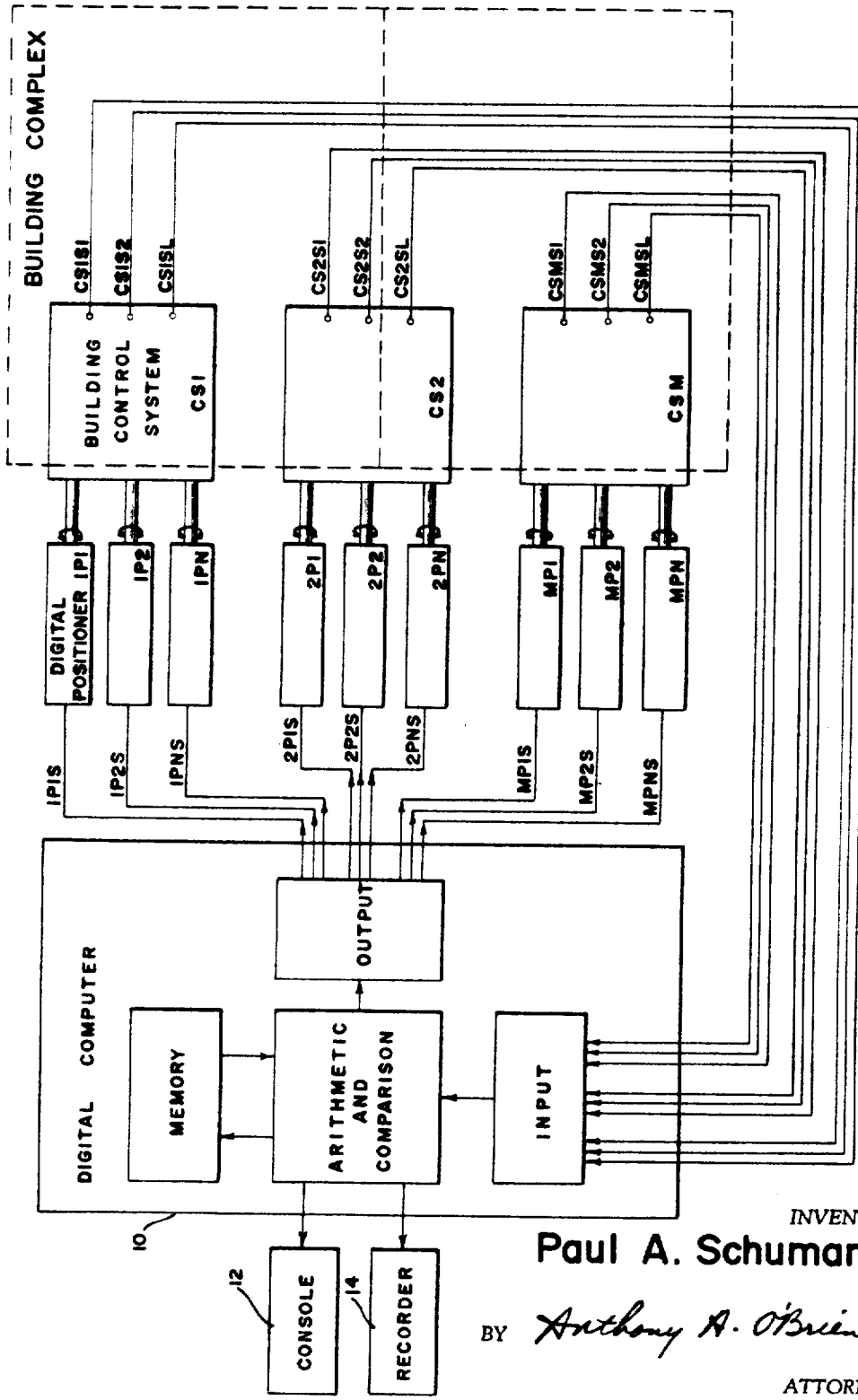
FIG. 1 is a block diagram of a computerized control system embodying this invention.

A preferred embodiment of the present invention includes a conventional digital computer 10. As is well known in the art, a digital computer utilizes the binary numbering system wherein output pulses of a first polarity represent the unit "1" and of a second polarity represent the unit "0." The digital computer 10 includes the usual components of a storage core or memory unit, an arithmetic and comparison unit, an output unit, and an input unit. A program of the data corresponding to control points for the operating systems to be controlled is stored in the memory unit and the input is provided with a plurality of input signals from such systems; since such input signals are analog signals they are connected to digital values and the arithmetic and comparison unit compares such values with the control points or limits on the preestablished program and does necessary arithmetic to decide the corrective action needed in such operating systems. The decision is then transferred to the computer's output unit which delivers digital output signals that are necessary to correct the condition errors in the operating systems. Further description of the specific details and operation of the computer is omitted for the sake of brevity since digital computers are well known; for example, a "Prodac 50" by Westinghouse may be utilized with the present invention.

The digital values supplied to the computer's output unit are also supplied to the console 12 and recorder 14 whereby the action of the computer 10 with respect to the systems being controlled is continuously illustrated at the console 12 and continuously recorded at the recorder 14.

As is shown on FIG. 1 of the drawing, the building complex includes a plurality of control systems for its electrical and mechanical operating systems; such control systems CS1, CS2 . . . CSM are each provided with a plurality of sensor devices (e.g., thermocouples) CS1S1, CS1S2 . . . CS1SL (and CS2S1 through CSMSL) to monitor the particular conditions of the control system and transmit signals indicative of such conditions to the input unit of the digital computer 10. Each control system includes a plurality of control devices for its building operating system, and each control device (not shown on FIGS. 1 and 2) is actuated by a digital positioner 1P1, 1P2 . . . 1PN (and 2P1 through MPN). Each building control system and the digital positioners therefor are controlled by a plurality of output digital signals from the computer's output unit. For instance, the series of output signals 1P1S are transmitted to the control device and digital positioner 1P1 of the first control system CS1; thus each respective series of output signals from 1P1S to MPNS are transmitted to the respective control devices and digital positioners 1P1 to MPN of respective control systems CS1 to CSM.

The series of computer output signals 1P1S to MPNS are each transmitted to a conventional multiplexer (not shown) to deliver the required number of digital signals for each control system. As is illustrated in FIG. 2, the series of output signals 1P1S are delivered as six signals 1P1S1 through 1P1S6; the series of output signals 1P2S and 1PNS are similarly delivered as six signals each, 1P2S1 to 1PNS6. The series of output signals 2P1S to MP1S are also transmitted to a conventional multiplexer for delivering the particular number of signals required of the control systems CS2 to CSM, respectively.

The control system CS1 of FIG. 1 is specifically illustrated in FIG. 2 as relating to a heating-ventilating-air conditioning system having a plurality of machines HAC1, HAC2 . . . HACN, the particular number of machines depending upon the size of the space being serviced. The machines HAC1, HAC2 . . . HACN may be boilers for a heating system, circulating fans for a ventilating system, or refrigeration units for an air conditioning system. For the sake of brevity only one such system will be described in connection with FIG. 2; thus the machines HAC1, HAC2 . . . HACN represent a plurality of boilers for a hot water heating system. The boilers HAC1, HAC2 . . . HACN are arranged in parallel having a common hot water outlet conduit 16 and a common return water inlet conduit 18. The hot water outlet conduit 16 is connected to a common supply conduit feeding a plurality of parallel branches 16–1, 16–2, 16–3 . . . 16–L leading to a plurality of parallel arranged heat exchanging devices E1, E2, E3 . . . EL, respectively. Of course, the numbers and the parallel arrangements of the boilers and the heat exchangers may be modified to series arrangements or combined parallel-series arrangements depending upon the particular installation. It should also be noted that the heat exchangers E1, E2, E3 . . . EL may be located to serve a single space in a building, such as an auditorium, and/or a plurality of spaces in a building, such as different zones having different heat requirements. In addition, each heat exchanger E1, E2, E3 . . . EL may be provided with an individual control device, such as a space thermostat to provide on-off and/or modulation of the hot water flow therethrough.

The heat exchanging devices E1, E2, E3 . . . EL have outlets defining a plurality of parallel branches 18–1, 18–2, 18–3 . . . 18–L, respectively, feeding the common return water inlet conduit 18 leading to the plurality of parallel arranged boilers HAC1, HAC2 . . . HACN. The temperature of the common return water inlet conduit 18 is sensed by any suitable sensing devices HACRS which transmits such a corresponding signal to the input unit of computer 10. The temperature of the hot water outlets from the boilers HAC1, HAC2 . . . HACN are sensed by sensing devices HAC1S, HAC2S . . . HACNS, respectively, which transmit corresponding signals to the input unit of computer 10. The temperature of the common hot water outlet conduit 16 is sensed by a sensing device HACCS which transmits such a corresponding signal to the input unit of the computer 10. With such a feedback signal arrangement, the temperature increase across the entire boiler system may be measured by the signals HACRS and HACCS for comparison by the computer 10; individual temperature increases across the boilers HAC1, HAC2 . . . HACN may be separately measured by the signals HACRS and HAC1S, HACRS and HACNS, respectively. Thus the need for operation of one or more of the boilers HAC1, HAC2 . . . HACN is determined by the computer 10 which has data corresponding to the operation of the boilers in its memory and delivers a series of output signals 1P1S, 1P2S . . . 1PNS, respectively, for one or more boiler operation. Each series of output signals provides on-off and modulation control of its respective boiler, e.g., computer output signals 1P1S1 and 1P1S2 transmit on-off signals to the control device of the boiler HAC1, and output signals 1P1S3 to 1P1S6 transmit direction and magnitude signals to the digital positioner 1P1 for modulating the control device of such boiler.

Each of the boilers HAC1, HAC2 . . . HACN are controlled by suitable control devices which are actuated by the shafts of the digital positioners 1P1, 1P2 . . . 1PN, respectively, and the movements of such shafts are transmitted to the pointers of potentiometers 1PT1, 1PT2 . . . 1PTN, respectively. Accordingly, the output of the digital positioners are provided with respective feedback signals 1P1FS, 1P2FS . . . 1PNFS to the computer 10 whereby the amount of any error in the digital positioner shafts is corrected by the output signals 1P1S3 to 1P1S6, 1P2S3 to 1P2S6 . . . 1PNS3 to 1PNS6, respectively.

The specific details of an air conditioning system for a building are illustrated in FIG. 3, which includes three air-conditioning machines in the form of chillers 1, 2 and 3. Only the operating and control diagrams for chiller 1 are shown in FIG. 3, and it is to be understood that identical operating and control diagrams are utilized for chiller 2 and chiller 3.

For a complete description of the digital positioner means which is disposed between the computer output signals and the control device of the chiller machine, reference is made to copending application Ser. No. 399,551, filed Sept. 28, 1964, by Kenneth G. Kreuter, now U.S. Patent No. 3,306,170, issued Feb. 28, 1967, and assigned to the same assignee as this invention. Accordingly, only the components necessary for an understanding of the present invention will be described here.

Output signals 1P1S1 and 1P1S2 from the digital computer 10 are connected to conductors 20 and 22, respectively, for on-off control of the chiller's compressor 98. Output signals 1P1S3 to 1P1S6 are connected to conductors 24, 26, 28 and 30, respectively; conductors 26 and 30 are connected to one terminal of the secondary of a transformer T whose primary is powered by a 60 cycle 120 v. source. The other terminal of the transformer secondary is connected to a conductor 32. The conductor 32 terminates in a common junction between a pair of relay switch coils 34 and 36, which are connected to the conductors 24 and 28, respectively. The coils 34 and 36 are alternately energized to actuate their respective switch arms 38 and 40 that are connected to a common terminal 44. The terminal 44 together with terminals 42 and 46 for the respective switch arms 38 and 40 are connected to a power supply and transfer network having a plurality of terminal leads 48 which are connected to the stator of a D.C. stepping motor 50.

The stepping motor 50 has a rotor 52 and a rotor shaft 54 connected for unitary rotation but permitting axial displacement of the shaft 54. Adjacent its end the shaft 54 has an O-ring seal whereby the shaft extends into a pneumatic relay housing. The end of shaft 54 includes an output drive screw 58 on which an output coupling nut 60 is threaded. A transverse drive pin 62 on the nut 60 is journalled to the bifurcated end of an operating lever 64 whose opposite end is biased on one side by a compression spring 66. The other side of the lever 64 controls a ball valve 68, while the center of such lever is pivotally mounted on a second ball 70 which is biased toward the lever by a compression spring 72. The ball 70 comprises an exhaust valve for the pneumatic relay chamber 74 by controlling an atmospheric port 76. The ball valve 68 controls a main pressure port 78 which is connected to a main pressure supply 80. A branch pressure port 82 from the chamber 74 is connected to a pneumatic conduit 84 leading to the pressure operating chamber 86 of a pneumatically operated control. The opposite chamber 88 of such control is defined by a motor diaphragm 90 from which an operating stem 92 extends.

The end of the operating stem 92 is connected to a flow control device in the form of a radially movable vane control 94 that is disposed in the closed Freon line of a refrigeration system. While any type of refrigeration system may be utilized with the present invention, FIG. 3 illustrates a conventional system wherein the vane control 94 controls the Freon flow into the evaporator 96 from which a compressor 98 delivers the Freon flow to a condenser 100; thence the Freon is returned to the evaporator 96 at a capacity determined by the vane controller 94.

As is well known in the art, the condenser 100 is cooled by water flowing therethrough from an inlet conduit 102 to an outlet conduit 104 which lead to a condenser water pump 106. The output of pump 106 forces the condenser water through a conduit 108 leading to a cooling tower 109. The cooling tower 109 is of conventional structure having opened sides and a fan for passing air over the water as it cascades to a water port connected to the conduit 102.

The three chiller machines are arranged with chiller 1 in parallel with chiller 2 and both chillers 1 and 2 in series with chiller 3. In a closed water circulating system, a water pump 110 delivers water to the parallel branch inlets 114 and 112 of the chillers 1 and 2, respectively. The water is chilled in the evaporator 96 and delivered to the chiller outlets 116 and 118 which feed a common conduit 120 defining the inlet for chiller 3. After being further cooled in chiller 3, the water is delivered to the common conduit 122 that feeds the parallel arranged air handling units AH1, AH2, AH3 . . . AHL, each of which returns the water to the common return water conduit leading back to the water pump 110.

Each of the air handling units AH1, AH2, AH3 . . . AHL may be separately controlled as by a space thermostat and each is provided with a temperature sensing device whereby temperature indicating signals 1S1, 1S2, 1S3 . . . 1SL are transmitted to the input unit of the digital computer 10. A temperature sensing device senses the common return water conduit 124 and transmits a common water return signal CRS to the input unit of the digital computer 10. The inlet and outlet water conduits of the chillers 1, 2 and 3 are each sensed by temperature sensing devices which transmit corresponding signals 1CTS1–1CTS2, 2CTS1–2CTS2 and 3CTS1–3CTS2, respectively to the input unit of the digital computer 10. With such a feedback signal arrangement, the temperature drop across each chiller as well as across the entire chiller system (by signals CRS and 3CTS2) is transmitted to the computer input unit for comparison whereby proper corrective signals are delivered from the computer output unit. The computer input unit is also provided: (1) with signals CRS and 3CTS1 as a measure of the temperature drop across the parallel arrangement of chiller 1 and 2; with signals 1CTS1 and 3CTS2 as a measure of the temperature drop across the series arrangement of chillers 1 and 2; and (2) with signals 2CTS1 and 3CTS2 as a measure of the temperature drop across the series arrangement of chillers 1 and 3.

The refrigerant compressor 98, the condenser water pump 106 and the chiller water pump 110 are provided with kilowatt-hour meters 98M, 106M and 110M, respectively, having sensing devices whereby power comsumption signals 1KM1, 1KM2 and 1KM3 are respectively fed back to the input unit of the digital computer 10. In addition, the chiller water outlets 116, 118 and 122 are provided with flow meters 1FM, 2FM and 3FM, respectively, having sensing devices whereby water flow rate signals 1FM1, 1FM2 and 1FM3 are respectively fed back to the input unit of the digital computer 10.

In describing the operation of the computerized control system shown on FIG. 3, it will be assumed that the memory program delivers three series output signals 1P1S, 1P2S and 1P3S to commence operation of all three chillers 1, 2 and 3 in the building air conditioning system. Thus with respect to the chiller 1, output signal 1P1ST1 start the fan on cooling tower 109, output signal 1P1SP1 start the condenser water pump 106, output signal 1P1SP3 start the chiller water pump 110, and output signal 1P1S1 starts the compressor 98. With similar output signals from the series 1P2S and 1P3S, the three chillers 1, 2 and 3 supply chilled water to the air handling units AH1, AH2, AH3 . . . AHL to maintain the air-conditioned space at a predetermined temperature.

A demand for more cooling of the air-conditioned space, as determined by the feedback signals to the computer input, results in computer output signals 1P1S3 and 1P1S4 energizing the relay coil 34 to close the switch arm 38 on the conductor terminal 42 whereby the digital stepping motor is rotated clockwise a stepped magnitude. Such rotation effects axial movement of the drive nut 60 which displaces the lever 64 away from the ball valve 68 so that the pneumatic flow from the pressure source 80 into the chamber 74 is increased; the pressure in chamber 86 of the pneumatic operator is correspondingly increased causing axial movement of the stem 92 to increase the opening of the control vanes 94. The capacity of the compressor 98 is thus increased resulting in a greater cooling of the chiller water flowing through the evaporator 96.

The movement of the stepping motor output shaft 54 is monitored by the potentiometer 1PT1 which feeds back a signal 1P1FS to the computer input unit so that as soon as the shaft 54 reaches its desired position, the computer output signal 1P1S3–4 are cut off and the stepping motor remains in such position. In the event of overshoot of the shaft 54, the computer output signals 1P1S5–6 correct the amount of overshoot.

The demand for cooling as determined by the digital computer 10 from the comparison of the feedback signals to the control points of the memory program, which include data corresponding to the operation of the chillers and the environmental temperature to be maintained, permits the energization of one or more chillers 1, 2 and 3 to satisfy such demand. Since the start-up cost of each chiller machine is so great, it is more efficient to optimize the operation of the three chillers. By measuring the temperature drop across the three chiller system, the temperature drop may be maintained substantially constant for the particular cooling demand determined by the digital computer 10. Thus, it is not necessary to shut down one chiller because the cooling demand is reduced but rather, the computerized control system permits one or more of the three chillers to be reduced in capacity in accordance with data corresponding to operation thereof in the memory so long as the total capacity of the three chillers is sufficient to meet the cooling demand. In addition, the digital computer 10 determines the efficiency of each chiller at a particular capacity and thus selects which chiller should be shut down in order not to sacrifice the overall efficiency.

When the air conditioning system is no longer needed, as when the autumn season commences, the computer output signals 1P1S2, 1P1ST2, 1P1SP2 and 1P1SP4 cause stopping of the compressor 98, the cooling tower fan 109, the condenser water pump 106, and the chiller water pump 110, respectively. While the output signals 1P1S1–6, 1P1ST1–2, and 1P1SP1–4 are represented on the drawing as single conductor lines, they are each double lines so that any start-stop signal to the equipment transmits a return to the computer as an indication that the signal has been followed.

Feedback signals from the flow meters and the kilowatt-hour meters provide the digital computer with information to be compared with load data for the corresponding machines whereby the console 12 and recorder 14 are provided with a continuous reading of the efficiency.

Inasmuch as the preferred embodiment of the present invention is subject to many modifications, variations in details and rearrangements of components, it is intended that all matter contained in the foregoing description or shown on the accompanying drawings shall be interpreted as illustrative and not in a limiting sense.

What is claimed is:

1. In a computerized central control system for a building having a plurality of zones therein, the combination comprising environmental control equipment including a plurality of temperature controlling means for controlling the environment within said building;

a computer having an input and a memory;

a plurality of temperature sensing means disposed in said plurality of zones within said building;

means for coupling signals corresponding to the temperatures sensed by said temperature sensing means to the input of said computer;

a plurality of condition sensing means for sensing operating conditions of said environmental control equipment;

means for coupling signals corresponding to the conditions sensed by said condition sensing means to the input of said computer;

said memory including data corresponding to the desired temperature in said plurality of zones and the operation of said environmental control equipment;

said computer including computing means for providing output signals in accordance with said data in said memory, said temperature signals and said condition signals;

control means for controlling the operation of said plurality of temperature controlling means in response to said output signals; and, means coupling said output signals to said control means.

2. The invention as recited in claim 1 wherein said control means includes positioning means for individually actuating said plurality of temperature controlling means.

3. In a computerized central control system for a building the combination comprising a heating system for controlling the environmental temperature within said building, said heating system including a plurality of heat controlling machines;

a cooling system for controlling the environmental temperature within said building, said cooling system including a plurality of air conditioning machines;

a computer including input means and memory means;

said memory means including data corresponding to the desired environmental temperature within said building and the operation of said heat controlling machines and said air conditioning machines;

a first plurality of condition sensing means disposed within said building to sense environmental temperature;

a second plurality of condition sensing means associated with said plurality of heat controlling machines;

a third plurality of condition sensing means associated with said plurality of air conditioning machines;

means coupling signals corresponding to the conditions sensed by said first, second and third pluralities of condition sensing means to said input means of said computer;

said computer including computing means for providing output signals in accordance with said data in said memory means and said first, second and third pluralities of conditions sensed; and, means coupling said output signals to said plurality of heat controlling machines and said plurality of air conditioning machines to individually control the operation thereof in accordance with said output signals whereby the desired environmental temperature of said building is maintained with efficient utilization of said heating and air conditioning machines.

4. In a building of the type having an environmental control system including a plurality of heating machines, said environmental control system having an inlet conduit and outlet conduit, a computerized central control system for controlling the environment within said building comprising in combination a computer having a memory;

said memory including data corresponding to the operation of said plurality of heating machines;

means for sensing the temperature in said inlet conduit and said outlet conduit and coupling signals corresponding to the temperatures sensed to said computer;

said computer including computing means for generating output signals in accordance with said data in said memory and said temperature signals;

means for individually controlling the operation of said plurality of heating machines in response to said output signals; and, means for coupling said output signals from said computer to said means for individually controlling said plurality of heating machines to provide efficient operation of said environmental control system.

5. The invention as recited in claim 4 wherein each of said plurality of heating machines has an inlet and an outlet, the inlets of said plurality of heating machines each being connected with said inlet conduit and the outlets of said plurality of heating machines each being connected with said outlet conduit and said means for sensing temperature includes means for sensing the temperature in each of said outlets and coupling signals corresponding to the temperatures sensed to said computer.

6. In a building of the type having an environmental control system therein, said environmental control system having an inlet conduit and an outlet conduit, a computerized central control system for controlling environmental conditions within said building comprising in combination a computer having memory means;

said memory means including data corresponding to the environmental conditions desired to be maintained within said building and the operation of said environmental control system;

condition sensing means for sensing conditions in said inlet conduit and said outlet conduit of said environmental control system;

means for coupling signals representative of the conditions sensed by said condition sensing means to said computer;

said computer including computing means responsive to said condition signals and said data in said memory means for generating output signals;

control means for controlling said environmental control system in response to said output signals; and, means for coupling said output signals to said control means.

7. The invention as recited in claim 6 wherein said control means includes positioning means for mechanically controlling the operation of said environmental control system.

8. A computerized control system for the air conditioning system for a building comprising a plurality of air conditioning machines in the building, control means for each air conditioning machine, digital computer means having a memory program corresponding to temperature control points for said air conditioning machines, input signal means to said computer means defining variations from said temperature control points, output signal means from said computer for each air conditioning machine defining operating signals for said air conditioning machines, digital positioning means operatively connected to said control means and being responsive to said output signal means, each of said output signal means including three signals, one of said signals defining a start-stop operation for its air conditioning machine, the second defining an increased variation for moving said digital positioning means in one direction, and the third defining a decreased variation for moving said digital positioning means in an opposite direction, and feedback signal means from said digital positioning means to said computer means for correcting any error in the position of said digital positioning means.

9. The invention as recited in claim 8 wherein said plurality of air conditioning machines are connected in parallel whereby the total capacity thereof may be distributed between each unit.

10. The invention as recited in claim 9 wherein said plurality of air conditioning machines have a common input line and a common output line whereby a constant temperature drop occurs across the plurality of air conditioning machines, 11. The invention as recited in claim 8 wherein said plurality of air conditioning machines have at least two machines connected in parallel and at least one machine connected in series with said two machines.

12. A computerized control system for the air conditioning system of a building, the combination comprising a plurality of chiller machines for said air conditioning system, a plurality of air handling units for said air conditioning system, a chilled water circulation system for supplying chilled water from said chiller machines to said air handling units, control means for operating each chiller machine, digital computer means having a memory program defining control points for each chiller machine, input signal means to said computer means defining operating conditions of each machine, output signal means from said computer defining operating signals for each machine, digital positioning means operatively connected to said control means for actuating the same in response to said output signal means, said digital positioning means including an output shaft for moving said control means a predetermined distance and direction according to said output signal means, and said output signal means including start-stop signals for each chiller machine, increased variation signals for moving said digital positioning means a corresponding distance in one direction and decreased variation signals for moving said digital positioning means a corresponding distance in an opposite direction.

13. The invention as recited in claim 12 wherein said plurality of chiller machines have a common chilled water inlet conduit and a common chilled water outlet conduit, and temperature sensors for said inlet and outlet conduits to transmit input signals to said digital computer means indicative of a temperature drop across said plurality of chiller machines.

14. The invention as recited in claim 13 wherein said plurality of chiller machines are provided with inlet and outlet chilled water temperature sensors to transmit input signals to said digital computer means indicative of a temperature drop across each chiller machine.

15. The invention as recited in claim 14 wherein said plurality of chiller machines are arranged in parallel.

16. The invention as recited in claim 14 wherein said plurality of chiller machines include at least two machines arranged in parallel and at least one machine arranged in series with the said two machines.

17. The invention as recited in claim 14 wherein said chilled water circulation system is provided with an electric circulating pump, meter sensing means on said pump transmits an input signal to said digital computer means indicative of the power consumption of said pump, and wherein each chiller machine is provided with an outlet flow meter sensing means to transmit corresponding input signals to said digital computer means indicative of the flow rate at the outlet of each chiller machine.

18. The invention as recited in claim 17 wherein said output signal means includes start-stop signals for said pump.

19. The invention as recited in claim 14 wherein each chiller machine includes a refrigeration system, and its corresponding control means includes variable vane control means for varying the capacity of said refrigeration system.

20. The invention as recited in claim 19 wherein said refrigeration system includes a compressor-condenser-evaporator arrangement having condenser water cooling system, and said output signal means includes start-stop signals for said condenser water cooling system.

References Cited

UNITED STATES PATENTS

| | | | |
|---|---|---|---|
| 3,324,458 | 6/1967 | MacArthur | 340—172.5 |
| 3,265,873 | 9/1966 | Sawyer | 235—151.1 |
| 3,174,298 | 3/1965 | Kleiss | 235—151.1 |
| 3,122,722 | 2/1964 | Subry et al. | 235—151.1 |
| 3,034,718 | 5/1962 | Freitas et al. | 235—151.1 |
| 2,932,471 | 4/1960 | Exner et al. | 235—151.1 |
| 2,712,414 | 7/1955 | Ziebolz et al. | 235—151.1 |

ROBERT C. BAILEY, *Primary Examiner.*

GARETH D. SHAW, *Assistant Examiner.*